US012537015B2

(12) United States Patent
Tang et al.

(10) Patent No.: US 12,537,015 B2
(45) Date of Patent: Jan. 27, 2026

(54) SPEECH ENHANCEMENT

(71) Applicant: Microsoft Technology Licensing, LLC, Redmond, WA (US)

(72) Inventors: Chuanxin Tang, Redmond, WA (US); Zhiyuan Zhao, Redmond, WA (US); Chong Luo, Beijing (CN); Wenjun Zeng, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 433 days.

(21) Appl. No.: 17/927,861

(22) PCT Filed: May 10, 2021

(86) PCT No.: PCT/US2021/031471
§ 371 (c)(1),
(2) Date: Nov. 25, 2022

(87) PCT Pub. No.: WO2022/005615
PCT Pub. Date: Jan. 6, 2022

(65) Prior Publication Data
US 2023/0298611 A1 Sep. 21, 2023

(30) Foreign Application Priority Data
Jun. 30, 2020 (CN) .......................... 202010617322.6

(51) Int. Cl.
*G10L 21/0232* (2013.01)
*G10L 21/0264* (2013.01)
*G10L 25/06* (2013.01)

(52) U.S. Cl.
CPC ...... *G10L 21/0232* (2013.01); *G10L 21/0264* (2013.01); *G10L 25/06* (2013.01)

(58) Field of Classification Search
CPC . G10L 21/0232; G10L 21/0264; G10L 25/06; G10L 21/0224; G10L 25/27
See application file for complete search history.

(56) References Cited

U.S. PATENT DOCUMENTS 6,389,377 B1 * 5/2002 Pineda ................... G10L 15/10
703/2
7,797,153 B2 * 9/2010 Hiroe .................. G10L 21/0272
704/211

(Continued)

FOREIGN PATENT DOCUMENTS

CN 103392349 A 11/2013
CN 104240717 A 12/2014

(Continued)

OTHER PUBLICATIONS

Notice of Allowance Received for Chinese Application No. 202010617322.6, mailed on Apr. 17, 2025, 08 Pages (English Translation Provided).

(Continued)

*Primary Examiner* — Huyen X Vo
(74) *Attorney, Agent, or Firm* — Schwegman Lundberg & Woessner, P.A.

(57) ABSTRACT

In accordance with implementations of the subject matter described herein, a solution for speech enhancement is proposed. In this solution, a target time-frequency representation at least indicating intensities of an input audio signal at different frequencies over time is obtained. The input audio signal comprises a speech component and a noise component. Frequency correlation information and time correlation information of the input audio signal is determined based on the target time-frequency representation. A target feature representation is generated based on the frequency correlation information, the time correlation information, and the target time-frequency representation. The (Continued)

target feature representation is for distinguishing the speech component and the noise component. An output audio signal is generated based on the target feature representation and the target time-frequency representation. The speech component is enhanced relative to the noise component in the output audio signal. In this way, the performance of speech enhancement can be improved.

15 Claims, 7 Drawing Sheets

(56) References Cited

U.S. PATENT DOCUMENTS

| | | | |
|---|---|---|---|
| 9,401,151 | B2 | 7/2016 | Lang et al. |
| 10,522,167 | B1 | 12/2019 | Ayrapetian et al. |
| 2004/0122662 | A1 | 6/2004 | Crockett |
| 2011/0235813 | A1 | 9/2011 | Gauger, Jr. |
| 2013/0231923 | A1 | 9/2013 | Zakarauskas |
| 2016/0111107 | A1 | 4/2016 | Erdogan et al. |
| 2018/0025721 | A1* | 1/2018 | Li .................... G06N 3/08 704/232 |

FOREIGN PATENT DOCUMENTS

| | | | |
|---|---|---|---|
| CN | 105355209 | A | 2/2016 |
| CN | 106941006 | A | 7/2017 |
| CN | 107077502 | A | 8/2017 |
| CN | 109166590 | A | 1/2019 |
| CN | 110383377 | A | 10/2019 |

OTHER PUBLICATIONS

Communication pursuant to Article 94(3) EPC, Received for European Application No. 21729699.5, mailed on Jul. 11, 2024, 5 pages.
First Action Received for Chinese Application No. 202010617322.6, mailed on Dec. 4, 2024, 23 pages (English Translation Provided).
Saleem, et al., "Variance based time-frequency mask estimation for unsupervised speech enhancement", Multimedia Tools and Applications, Jul. 25, 2019, pp. 1-25.
Tang, et al., "Joint Time-Frequency and Time Domain Learning for Speech Enhancement", Proceedings of the Twenty-Ninth International Joint Conference on Artificial Intelligence (IJCAI-20), Jan. 31, 2021, pp. 3816-3822.
Yin, et al., "PHASEN: A Phase-and-Harmonics-Aware Speech Enhancement Network", The Thirty-Fourth AAAI Conference on Artificial Intelligence, Nov. 12, 2019, pp. 9458-9465.
Yuan, et al., "Noise estimation based on time-frequency correlation for speech enhancement", Applied Acoustics, Jan. 8, 2013, pp. 770-781.
Chakrabarty, et al., "Time-Frequency Masking Based Online Speech Enhancement with Multi-Channel Data Using Convolutional Neural Networks", In Proceedings of 16th International Workshop on Acoustic Signal Enhancement, Sep. 17, 2018, pp. 476-480.
Lee, et al., "Dual Attention in Time and Frequency Domain for Voice Activity Detection", In Repository of arXiv:2003.12266v1, Mar. 27, 2020, 5 Pages.
Luo, et al., "TaSNet: Time-Domain Audio Separation Network for Real-Time, Single-Channel Speech Separation", In Proceedings of IEEE International Conference on Acoustics, Speech and Signal Processing, Apr. 15, 2018, pp. 696-700.
"International Search Report and Written Opinion Issued in PCT Application No. PCT/US21/031471", Mailed Date: Aug. 25, 2021, 12 Pages.
Shah, et al., "Time-Frequency Mask-based Speech Enhancement using Convolutional Generative Adversarial Network", In Proceedings of Asia-Pacific Signal and Information Processing Association Annual Summit and Conference, Nov. 12, 2018, pp. 1246-1251.
Yin, et al., "PHASEN: A Phase-and-Harmonics-Aware Speech Enhancement Network", In Repository of arXiv:1911.04697v1, Nov. 12, 2019, 9 Pages.
Yuan, et al., "Noise Estimation Based on Time-Frequency Correlation for Speech Enhancement", In Journal of Applied Acoustics, vol. 74, Issue 5, May 2013, pp. 770-781.
Zhang, et al., "Deep Learning for Environmentally Robust Speech Recognition: An Overview of Recent Developments", In Repository of arXiv: 1705.10874v1, May 30, 2017, 14 Pages.

* cited by examiner

SPEECH ENHANCEMENT

CROSS-REFERENCE TO RELATED APPLICATION

This application is a U.S. National Stage Filing under 35 U.S.C. 371 of International Patent Application Serial No. PCT/US2021/031471, filed May 10, 2021, and published as WO 2022/005615 A1 on Jan. 6, 2022, which claims priority to Chinese Application No. 202010617322.6, filed Jun. 30, 2020, which applications and publication are incorporated herein by reference in their entirety.

BACKGROUND

During speech recording or speech communication, speech is usually disturbed by noise in the environment. That is, a recorded or transmitted audio signal will include both speech and noise. Speech enhancement is intended to recover pure speech from noise-corrupted speech. Many fields such as video processing, audio processing, video conferencing, voice over Internet protocol (VoIP), speech recognition and hearing aids impose demands for speech enhancement technology. According to the signal domain they work in, existing speech enhancement methods can be classified into time-frequency (T-F) domain methods and time-domain methods.

SUMMARY

In accordance with implementations of the subject matter described herein, there is provided a solution for speech enhancement. In this solution, a target time-frequency representation at least indicating intensities of an input audio signal at different frequencies over time is obtained. The input audio signal comprises a speech component and a noise component. Frequency correlation information and time correlation information of the input audio signal is determined based on the target time-frequency representation. A target feature representation is generated based on the frequency correlation information, the time correlation information, and the target time-frequency representation. The target feature representation is for distinguishing the speech component and the noise component. An output audio signal is generated based on the target feature representation and the target time-frequency representation. The speech component is enhanced relative to the noise component in the output audio signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference signs refer to the same or similar elements.

DETAILED DESCRIPTION

The subject matter described herein will now be discussed with reference to several example implementations. It is to be understood these implementations are discussed only for the purpose of enabling persons skilled in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As used herein, the term "neural network" can handle inputs and provide corresponding outputs and it usually includes an input layer, an output layer and one or more hidden layers between the input and output layers. The neural network used in the deep learning applications usually includes a plurality of hidden layers to extend the depth of the network. Individual layers of the neural network are connected in sequence, such that an output of a preceding layer is provided as an input for a following layer, where the input layer receives the input of the neural network while the output of the output layer acts as the final output of the neural network. Each layer of the neural network includes one or more nodes (also referred to as processing nodes or neurons) and each node processes the input from the preceding layer. In the text, the terms "neural network," "network" and "neural network model" may be used interchangeably.

As used herein, "speech enhancement" refers to a task which is intended to recover pure speech from noise-corrupted speech. "Speech enhancement" may be implemented by improving the quality of a speech signal, eliminating or reducing a noise signal and a combination thereof. Therefore, similar expressions such as "speech is enhanced relative to noise" can mean that noise is removed or reduced.

Example Environment

Figure 1:
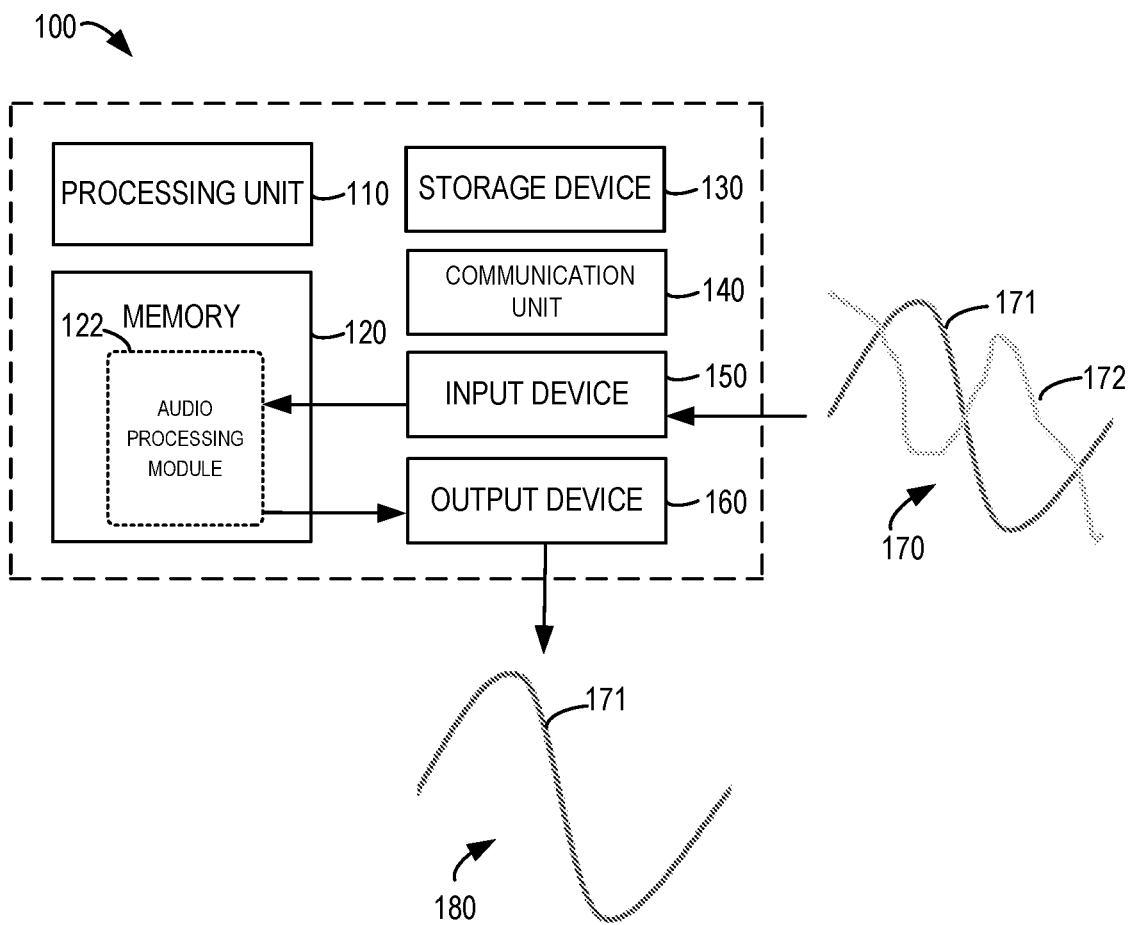
FIG. 1 illustrates a block diagram of a computing device in which various implementations of the subject matter described herein can be implemented.

FIG. 1 illustrates a block diagram of a computing device 100 in which various implementations of the subject matter described herein can be implemented. It should be appreciated that the computing device 100 shown in FIG. 1 is only for illustration, without suggesting any limitation to the functions and scopes of the implementations of the subject matter described herein in any manner. As shown in FIG. 1, the computing device 100 includes a computing device 100 in a form of a general-purpose computing device. Components of the computing device 100 may include, but are not limited to, one or more processors or processing units 110, a memory 120, a storage device 130, one or more communication units 140, one or more input devices 150, and one or more output devices 160.

In some implementations, the computing device 100 may be implemented as various user terminals or service terminals with computing capability. The service terminals may be servers provided by various service providers, large-scale computing devices, and the like. For example, a user terminal may be any type of mobile terminal, fixed terminal or portable terminal, including a mobile phone, a site, a unit, a device, a multimedia computer, a multimedia tablet, Internet nodes, a communicator, a desktop computer, a laptop computer, a notebook computer, a netbook computer, a tablet computer, a personal communication system (PCS) device, a personal navigation device, a personal digital assistant (PDA), an audio/video player, a digital camera/video, a positioning device, a television receiver, a radio broadcast receiver, an electronic book device, a gaming device or any other combination thereof including accessories and peripherals of these devices or any other combination thereof. It should also be appreciated that the computing device 100 can support any type of user-specific interface (such as a "wearable" circuit, and the like).

The processing unit 110 may be a physical or virtual processor and may perform various processing based on programs stored in the memory 120. In a multi-processor system, a plurality of processing units executes computer-executable instructions in parallel so as to improve the parallel processing capability of the computing device 100. The processing unit 110 may also be referred to as a central processing unit (CPU), microprocessor, controller and microcontroller.

The computing device 100 usually includes a plurality of computer storage mediums. Such a medium may be any available medium accessible by the computing device 100, including, but not limited to, a volatile and non-volatile medium, a removable and non-removable medium. The memory 120 may be a volatile memory (e.g., a register, a cache, a random access memory (RAM)), a non-volatile memory (such as, a read-only memory (ROM), an electrically erasable programmable read-only memory (EEPROM), flash), or any combination thereof. The memory 120 may include an audio processing module 122, which is configured to perform various functions described herein. The audio processing module 122 may be accessed and operated by the processing unit 110 to realize corresponding functions.

The storage device 130 may be a removable or non-removable medium, and may include a machine-readable medium, which may be used for storing information and/or data and be accessed within the computing device 100. The computing device 100 may further include additional removable/non-removable, volatile/non-volatile storage mediums. Although not shown in FIG. 1, a disk drive may be provided for reading from or writing into a removable and non-volatile disk and a disc drive may be provided for reading from or writing into a removable and non-volatile optical disc. In such cases, each drive may be connected to a bus (not shown) via one or more data medium interfaces.

The communication unit 140 implements communication with another computing device via a communication medium. Additionally, functions of components in the computing device 100 may be implemented by a single computing cluster or a plurality of computing machines that may communicate via communication. Therefore, the computing device 100 may operate in a networked environment using a logical link with one or more other servers, a personal computer (PC) or a further general network node.

The input device 150 may be one or more of a variety of input devices, such as a mouse, a keyboard, a trackball, a voice-input device, and the like. The output device 160 may be one or more of a variety of output devices, for example, a display, a loudspeaker, a printer, and so on. By means of the communication unit 140, the computing device 100 may further communicate with one or more external devices (not shown) such as the storage device, display device, and the like, with one or more devices that enable users to interact with the computing device 100, or any device (e.g., a network card, a modem, and the like) that enable the computing device 100 to communicate with one or more other computing devices, if required. Such communication may be performed via an input/output (I/O) interface (not shown).

In some implementations, as an alternative of being integrated on a single device, some or all components in the computing device 100 may also be provided in the form of cloud computing architecture. In the cloud computing architecture, these components may be provided remotely and work together to implement the functions described by the subject matter described herein. In some implementations, the cloud computing provides computation, software, data access and storage services which will not require end users to be aware of physical location or configuration of the system or hardware that provides these services. In various implementations, the cloud computing provides the services via a wide area network (such as Internet) using a suitable protocol. For example, the cloud computing provider provides, via the wide area network, the applications, which can be accessed through a web browser or any other computing component. Software or components of the cloud computing architecture and respective data may be stored on a server at a remote location. The computing resources in the cloud computing environment may be merged or distributed at a location in a remote data center. The cloud computing infrastructure may be used to provide, via a shared datacenter, the services even though they are shown as a single access point for the user. Therefore, components and functions described herein can be provided using the cloud computing architecture from a service provider at a remote location. Alternatively, components and functions may also be provided from a conventional server, or they may be mounted on a client device directly or in other ways.

The computing device 100 may be used for implementing speech enhancement in various implementations of the subject matter described herein. As shown in FIG. 1, the computing device 100 may receive an input audio signal 170 through the input device 150, the input audio signal 170 including a speech component 171 and a noise component 172. The input audio signal 170 may also be referred to as a to-be-processed audio signal. As depicted, the input audio signal 170 appears as a waveform in time domain. In some implementations, the input audio signal 170 may be a segment of pre-recorded and stored audio signals, for example, a portion of an audio file. Such an implementation may also be referred to as an offline implementation. In other implementations, the input audio signal 170 may be a segment of audio signals generated in real time, for example, audio data generated during video conferencing.

The computing device 100 may implement the solution for speech enhancement as described herein, to generate an output audio signal 180. In the output audio signal 180, a speech component 171 is enhanced relative to a noise component 172. In the example of FIG. 1, only the speech component 171 is retained, and the noise component 172 is removed.

As mentioned above, existing speech enhancement methods include time-frequency domain methods and time domain methods. The time domain method uses an encoder-decoder architecture to directly model the waveform in the time domain including a speech component and a noise component, and separate the speech component and the noise component from an output of the encoder.

The time-frequency domain method is based on a two-dimensional spectrogram. In a typical time-frequency domain method, a short-time Fourier transform (STFT) is used to convert a raw audio signal into a spectrogram. Then, a T-F mask is predicted by a separate network and is applied to the spectrogram to generate an output spectrogram. Finally, the output spectrogram is converted back to a time-domain signal through an inverse STFT (ISTFT), that is, a time-domain waveform. As compared with the time-domain method, the time-frequency domain method may benefit from abundant auditory pattern information in the spectrogram.

In some conventional time-frequency domain solutions, a frequency transform block (FTB) is used at the front end of the classification network to capture frequency-domain harmonic correlations. At the back end of the classification network, a bidirectional long short-term memory network (Bi-LSTM) is used to capture time correlations. In some other conventional time-frequency domain solutions, a spectrogram is processed into time series and a converter model is used to capture long-range time correlations.

Inventors of the present disclosure have realized that the correlation of the speech component in frequency domain (also referred to as a frequency correlation) is different from the correlation of the noise component in the frequency domain. Likewise, the correlation of the speech component in time domain (also referred to as a time correlation) is different from the correlation of the noise component in frequency domain. Therefore, frequency-domain and time-domain correlations are of significance to denoising performance. However, in the above-mentioned conventional solutions, frequency-domain and time-domain correlations are separately considered and learned. The separation of such two types of correlations results in that time-domain and frequency-domain information cannot be fully integrated, which is adverse to the improvement of speech enhancement performance.

Some problems in existing speech enhancement solutions have been discussed as above. In accordance with implementations of the subject matter described herein, a solution for speech enhancement is provided, which is intended to solve one or more of the above and other potential problems. In this solution, a time-frequency representation (e.g., a spectrogram) of an input audio signal comprising a speech component and a noise component is obtained. Based on the time-frequency representation, frequency correlation information and time correlation information of the input audio signal is determined according to an attention mechanism. Then, a target feature representation for distinguishing the speech component and the noise component is generated based on the time correlation information, the frequency correlation information, and the time-frequency representation. An output audio signal is generated based on the target feature representation and the time-frequency representation. The speech component is enhanced relative to the noise component in the output audio signal. The speech enhancement solution proposed herein can make full use of the correlation information of an audio signal in time domain and frequency domain. In this way, the performance of speech enhancement can be improved, which helps to obtain completely pure speech.

Various example implementations of this solution are described in detail below with reference to the drawings.

System Architecture

Figure 2:
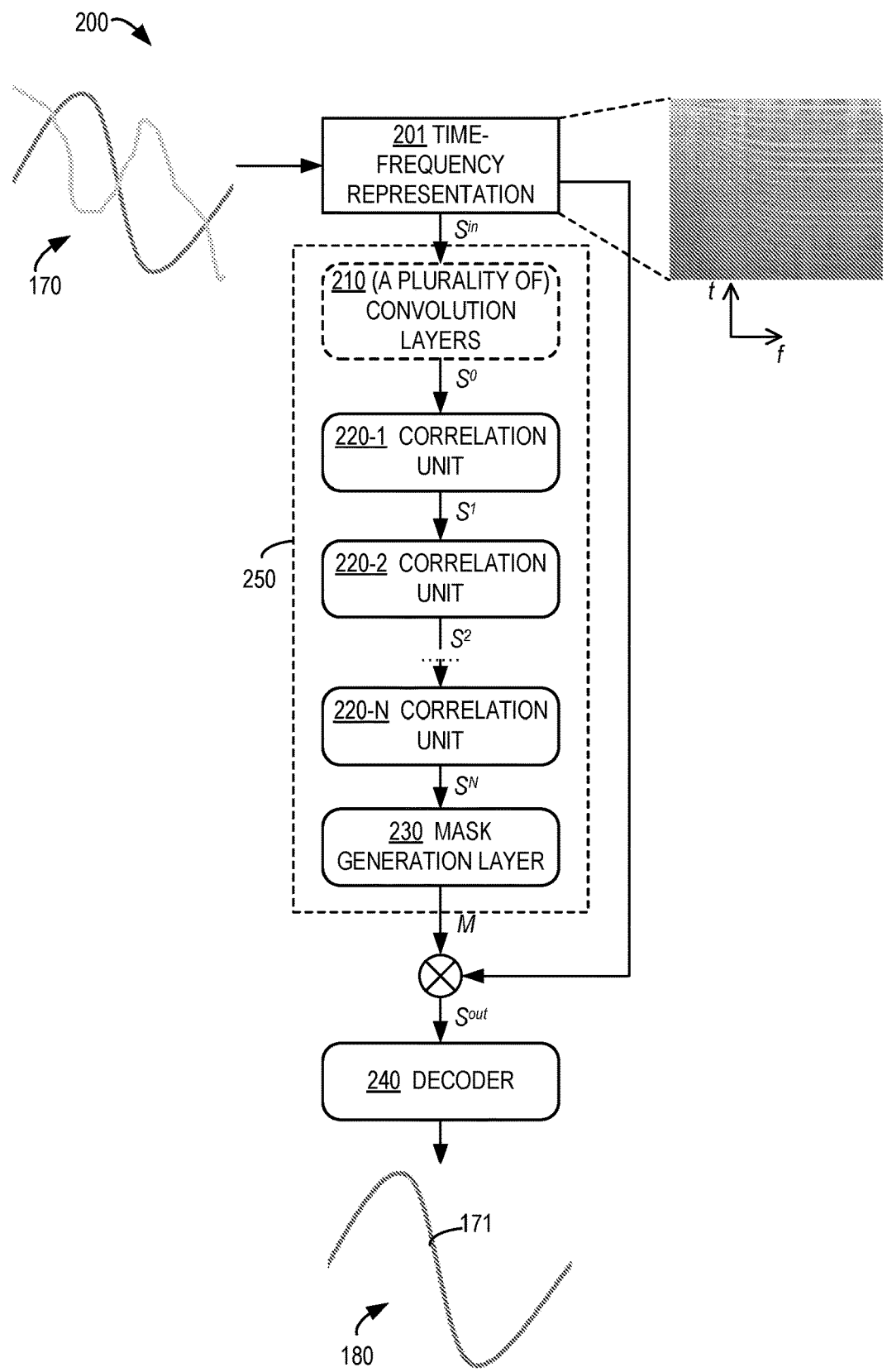
FIG. 2 illustrates an architecture diagram of a system for speech enhancement in accordance with implementations of the subject matter described herein.

FIG. 2 shows an architecture diagram of a system 200 for speech enhancement in accordance with implementations of the subject matter described herein. The system 200 may be implemented in the computing device 100 in FIG. 1. For example, in some implementations, the system 200 may be implemented as at least one part of the audio processing module 122 of the computing device 100 in FIG. 1, that is, implemented as a computer program module. As shown in FIG. 2, the system 200 as a whole may include a classification network 250 and a decoder 240. The classification network 250 may include at least one correlation unit. FIG. 2 shows serial correlation units 220-1, 220-2 . . . 220-N (collectively or separately referred to as a "correlation unit 220," where N≥1). It should be appreciated that the structure and functionality of the system 200 are described only for the purpose of illustration, rather than suggesting any limitation on the scope of the subject matter described herein. Implementations of the subject matter described herein may also be implemented in a different structure and/or functionality.

As shown in FIG. 2, first a time-frequency representation 201 is obtained, which is also referred to as a "target time-frequency representation" herein. The time-frequency representation 201 at least indicates intensities of the input audio signal 170 at different frequencies over time. In FIG. 2, one example of the time-frequency representation 201 is illustrated in the form of a spectrogram. In some implementations, the system 200 may directly obtain the time-frequency representation 201 without processing the input audio signal 170.

In some implementations, the system 200 may process the input audio signal 170 to generate at least one part of the time-frequency representation 201. Although not shown, the system 200 may generate the time-frequency representation of the input audio signal 170 by using STFT. In some implementations, for example, the above described offline implementation, the input audio signal 170 may be a segment of a pre-captured audio signal with a predetermined length (e.g., 3 seconds). In such implementations, the time-frequency representation of the input audio signal 170 is the time-frequency representation 201.

In some implementations, for example, the above described online implementation, the input audio signal 170 may be an audio signal generated in real time. In such implementations, in order to meet real-time requirements, the duration of the input audio signal 170 is usually short, for example, only tens of milliseconds. At the same time, in order to obtain high-quality speech enhancement, the correlation of the audio signal over a long time is required. Therefore, in such implementations, besides the time-frequency representation (also referred to as a "second time-frequency representation") of the input audio signal 170, the time-frequency representation 201 may further include the time-frequency representation (also referred to as a "first time-frequency representation) of a processed audio signal. That is, the time-frequency representation 201 is a combination of the first time-frequency representation and the second time-frequency representation.

The processed audio signal may occur before the input audio signal 170, for example, immediately before the input audio signal 170 in time. The input audio signal 170 and the processed audio signal may have a predetermined total length. It should be appreciated that the above-mentioned time length is merely exemplary and not intended to limit the scope of the subject matter described herein.

The time-frequency representation 201 with a complex value may be represented by $S_{in} \in \mathbb{R}^{T \times F \times 2}$, where T represents the number of time periods in time domain and F represents the number of frequency bands in frequency domain. As shown in FIG. 2, the time-frequency representation 201 is inputted into the classification network 250.

In some implementations, the classification network 250 may include one or more convolution layers 210, for example, 1×7 convolution layers and 7×1 convolution layers. "m×n convolution layers" refer to convolution layers with a convolution kernel size of m×n herein. The time-frequency representation 201 is fed into the one or more convolution layers 210 to generate a feature representation $S^0 \in \mathbb{R}^{T \times F \times C}$, where C represents the number of channels. In some other implementations, the classification network 250 may also not include one or more convolution layers 210. The time-frequency representation 201 may be directly inputted to the correlation unit 220-1.

The correlation unit 220-1 may generate a feature representation $S^1$ based on the time-frequency representation 201 or the feature representation $S^0$. Other correlation units 220-2 to 220-N each may generate a new feature representation based on the feature representation of the preceding correlation unit. Generally, the feature representation generated by the $i^{th}$ correlation unit 220 may be represented as $S^i$, where $i \in \{1, 2, \ldots, N\}$. In some implementations, for example, in offline implementations, the feature representation $S^i$ may have the same dimensions as the feature representation $S^0$, that is, $S^N \in \mathbb{R}^{T \times F \times C}$. In other implementations, for example, in online implementations, the feature representation $S^i$ may be less than the feature representation $S^0$ in time dimension, which will be described with reference to FIG. 5 below.

The one or more correlation units 220 may use the frequency correlation and the time correlation of the audio signal to generate the feature representation $S^i$. In some implementations, both the frequency correlation and the time correlation may be simultaneously used in each correlation unit 220. In some implementations, both the frequency correlation and the time correlation may be simultaneously used in at least one correlation unit, and only the frequency correlation is used in other correlation units. For example, both the frequency correlation and the time correlation may be simultaneously used in the first correlation unit 220-1, and only the frequency correlation is used in other correlation units 220-2 to 220-N.

In this specification, feature representations $S^1, S^2 \ldots S^{N-1}$ generated by the first (N−1) correlation units are also referred to as "intermediate feature representations," and the feature representation $S^N$ generated by the last correlation unit 220-N is also referred to as the "target feature representation." The intermediate feature representation and the target feature representation are used to distinguish the speech component and the noise component.

The feature representation $S^N$ generated by the last correlation unit 220-N is fed to a mask generation layer 230. The mask generation layer 230 generates a mask $M \in T \times F \times C_m$ based on the feature representation $S^N$, where $C_m$ is the number of channels. As one example, the mask generation layer may be a head layer, which may be implemented as a 1×1 convolution layer with $C_m=2$.

As shown in FIG. 2, the classification network 250 generates the mask M as an output. Then, the mask M is applied to at least one part of the time-frequency representation 201 to determine a masked time-frequency representation $S^{out}$. It should be appreciated that in the masked time-frequency representation $S^{out}$, the speech component is enhanced relative to the noise component. Therefore, the masked time-frequency representation $S^{out}$ may also be referred to as an enhanced time-frequency representation.

In some implementations, for example, in offline implementations, the mask M may be applied to the complete time-frequency representation 201. As one example, if the mask generation layer 230 is implemented as a 1×1 convolution layer with $C_m=2$, then the masked time-frequency representation $S^{out}$ may be determined as below:

$$S^{out} = f(M) \odot g(S^{in}) \quad (1)$$

where $f(M)=\tanh(|M|)*M/|M|$, $g(S^{in})=S^{in}$ and $\odot$ denotes complex multiplication.

In other implementations, for example, in online implementations, the time-frequency representation 201 may include the first time-frequency representation of the processed audio signal and the second time-frequency representation of the input audio signal 170 as described above. Therefore, in such implementations, the mask M may only be applied to a part of the time-frequency representation 201, which corresponds to the second time-frequency.

The masked time-frequency representation $S^{out}$ is fed to a decoder 240 and converted into an output audio signal 180 by the decoder 240. In some implementations, the decoder 240 may be a decoder based on fixed transform. For example, the decoder 240 may implement an ISTFT corresponding to an STFT which is used to generate the time-frequency representation of the input audio signal 170.

In some implementations, the decoder 240 may be a trained decoder. Such a decoder 240 may be trained to transform intensities of an audio signal at different frequencies over time into a waveform over time. Although a decoder does not need to perform exactly opposite operations of an encoder, the following method may be used to ensure the convergence of an encoder network in some implementations. For example, the network structure of the decoder 240 may be configured as the same convolution implementation as ISTFT. Specifically, the encoder 240 may be implemented as a one-dimensional transposed convolution layer whose kernel size and stride are the window length and hop size used in the STFT.

In such implementations, the decoder 240 may be trained together with the classification network 250. The system 200 may be implemented as a fully learnable end-to-end system. In this way, the learnability of the system 200 is increased, thereby helping to improve the performance of speech enhancement.

Attention Mechanism

Figure 3:
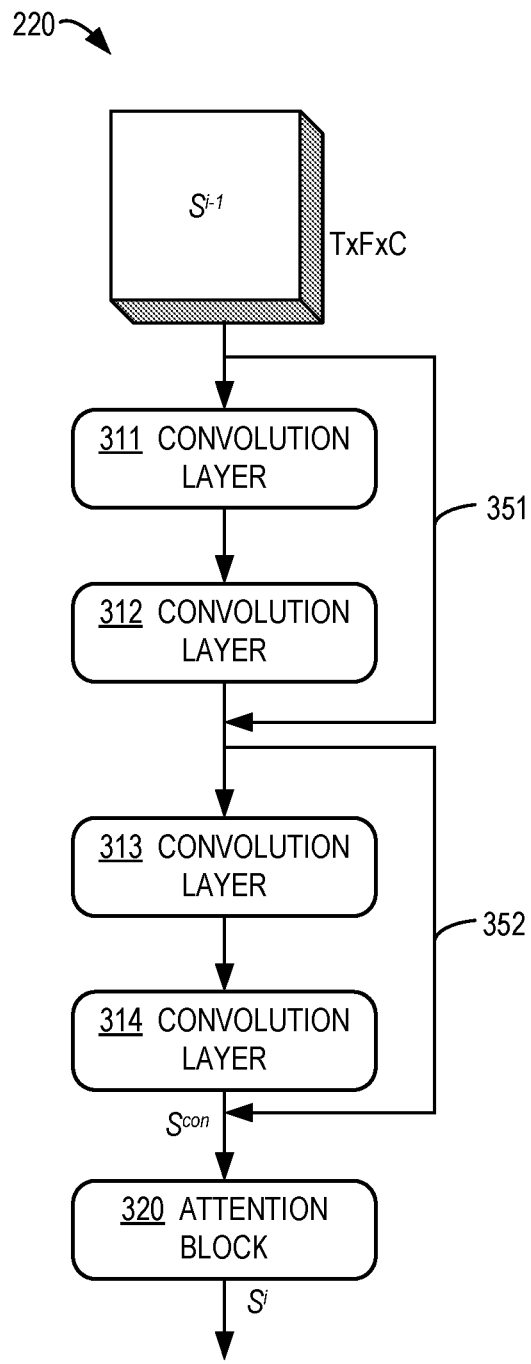
FIG. 3 illustrates a block program of a correlation unit in accordance with some implementations of the subject matter described herein.

The overall architecture of the system 200 for speech enhancement has been described above. Description is presented below to some implementations of the correlation unit 220. FIG. 3 shows a block diagram of the correlation unit 220 in accordance with some implementations of the subject matter described herein. The correlation unit 220 may determine an output feature representation $S^i$ based on an input feature representation $S^{i-1}$.

Generally, the correlation unit 220 may include two parts. The first part includes a group of convolution layers 311, 312, 313 and 314, and the second part includes an attention block 320. In the training process of the system 200, the convolution layers 311, 312, 313 and 314 may learn the partial correlation of an audio signal. Therefore, when processing the input audio signal 170, the partial correlation of the input audio signal 170 may be used via the convolution layers 311, 312, 313 and 314. As one example, the convolution layers 311, 312, 313 and 314 may be implemented as 3×3 convolution layers.

As shown in FIG. 3, in some implementations, a skip connection, also referred to as a residual connection may be employed between every two convolution layers. With the skip connection, the performance of speech enhancement can be improved by increasing the network depth.

The above described number of convolution layers, connection mode and convolution kernel size are merely schematic and not intended to limit the scope of the subject matter described herein. In accordance with implementations of the subject matter described herein, any proper number of convolution layers and any proper convolution kernel size may be used. In some implementations, different correlation units 220 may have different numbers of convolution layers.

The second part of the correlation unit 220 may include the attention block 320. During the training process of the system 200, the attention block 320 may learn the long-range correlation (also referred to as global correlation) of an audio signal based on the attention mechanism. Therefore, when processing the input audio signal 170, the long-range correlation of the input audio signal 170 may be used via the attention block 320. Specifically, the attention block 320 receives from the convolution layer 314 a feature representation $S^{con}$ which is generated using the partial correlation, and determines the feature representation $S^i$ based on the feature representation $S^{con}$ and the long-range correlation with the attention mechanism.

In the time-frequency representation (e.g., spectrogram), the long-range correlation exists both in time domain (i.e., along a time axis) and frequency domain (i.e., along a frequency axis). It should be appreciated that as time series, the audio signal contains the global correlation along the time axis and contains the harmonic correlation along the frequency axis. In this specification, the correlation along the time axis is also referred to as time correlation, and the correlation along the frequency axis is also referred to as frequency correlation.

The attention block 320 may use the time correlation and the frequency correlation in parallel. Such attention is also referred to as "dual-path attention block (DAB)." A lightweight DAB solution is provided herein in order to make full use of the time correlation and the frequency correlation without causing too much computational consumption.

Figure 4:
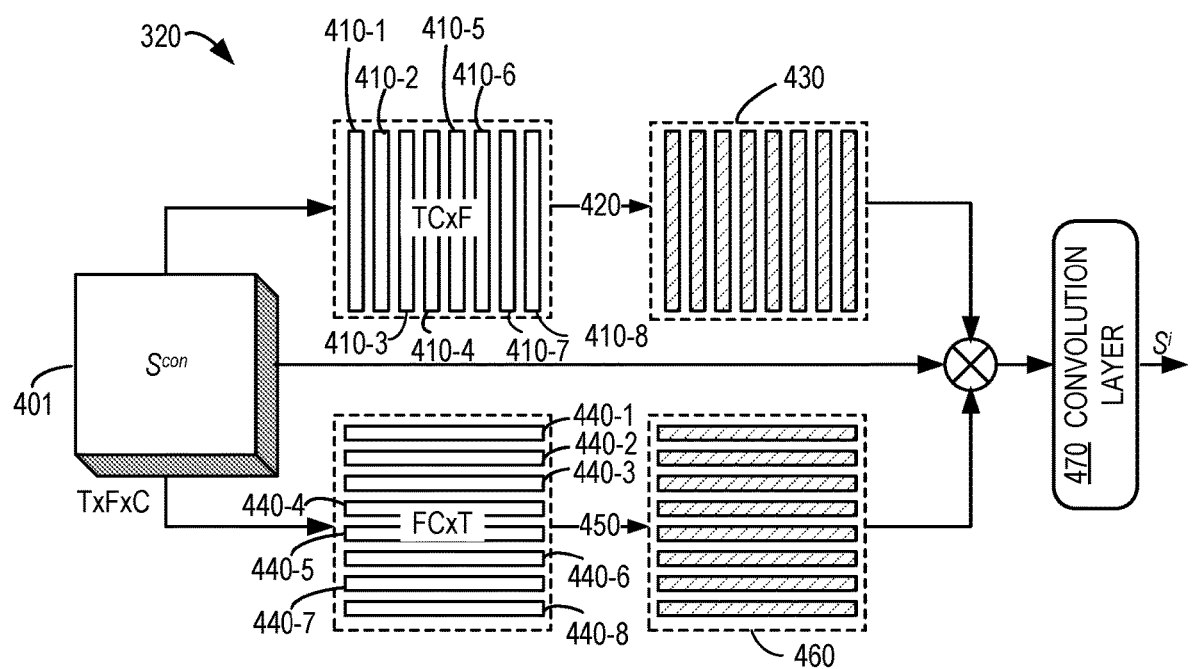
FIG. 4 illustrates a block diagram of an attention block in accordance with some implementations of the subject matter described herein.

FIG. 4 shows a block diagram of the attention block 320 in accordance with some implementations of the subject matter described herein. In the example of FIG. 4, a feature representation 401 (also denoted as $S^{con}$) from the convolution layer 314 has T×F×C dimensions. As described above, T means that the time-frequency representation 201 is associated with T frequency bands in time domain, F means that the time-frequency representation 201 is associated with F frequency bands in frequency domain, and C represents the number of channels. It should be appreciated that for the correlation unit 220-1, the feature representation 401 is the convolved time-frequency representation 201; for the other correlation units 220-2 to 220-N, the feature representation 401 is the feature representation generated by a preceding correlation unit, that is, the intermediate feature representation mentioned in this specification.

On the frequency path, the two-dimensional feature representation 401 with C channels is decomposed into TC (i.e., T×C) frequency feature representations 410-1 to 410-8, which are collectively or separately referred to as frequency-domain feature representations 410. Each of the frequency-domain feature representations 410 corresponds to one of T time periods and includes multiple features in the F frequency bands. Each of the frequency-domain feature representations 410 may be implemented as a vector with dimension 1×F.

As shown by an arrow 420, the attention mechanism is applied to each frequency-domain feature representation 410 along the frequency axis to obtain an updated frequency-domain feature representation 430. In this specification, the set of frequency-domain feature representations updated by applying the attention mechanism is referred to as frequency correlation information 430. If there are multiple correlation units 220, the frequency correlation information in the attention blocks 320 of the second to Nth correlation units 220 may also be referred to as the updated frequency correlation information.

In some implementations, a self-attention mechanism may be used to learn the attention map for each frequency-domain feature representation (may be considered as a sample) 410. Each element in the attention map indicates the correlation of an audio signal in corresponding frequency bands.

Inventors of the present disclosure have realized that the harmonic correlation of an audio signal in frequency domain is sample-independent, and in some classical speech enhancement solutions, usually a uniform non-linear function is applied along the frequency axis to reproduce harmonics. Therefore, in some implementations, the sample-independent attention mechanism may be applied along the frequency axis. Specifically, in such implementations, applying the attention mechanism shown by the arrow 420 may be implemented through a fully connected layer. In the process of training the system 200 with a reference audio signal, a parameter of the fully connected layer may be learned. In other words, the parameter of the fully connected layer indicates the correlation of the reference audio signal in the F frequency bands. The process of applying the sample-independent attention mechanism to a certain frequency-domain feature representation 410 corresponds to the process of multiplying a 1×F vector by an F×F weight matrix. In this specification, the parameter of the fully connected layer indicating the frequency correlation is also referred to as frequency-domain weighting information.

Likewise, on the time path, the two-dimensional feature representation 401 with C channels is decomposed into FC (i.e., F×C) time-domain feature representations 440-1 to 440-8, which may also be collectively or separately referred to as time-domain feature representation 440. Each time-domain feature representation 440 corresponds to one of F frequency bands and includes multiple features in T time periods. Each time-domain feature representation 440 may be implemented as a vector with dimension T×1.

As shown by an arrow 450, the attention mechanism is applied to each time-domain feature representation 440 along the time axis to obtain an updated time-domain feature representation 440. In this specification, the set of time-domain feature representations updated by applying the attention mechanism is referred to as time correlation information 460. If there are multiple correlation units 220, the time correlation information in the attention blocks 320 of the second to Nth correlation units 220 may also be referred to as the updated time correlation information.

In some implementations, a self-attention mechanism may be used to learn the attention map for each time-domain feature representation (may be considered as a sample) 440. Each element in the attention map indicates the correlation of an audio signal in corresponding time periods.

Like sample-independent harmonic correlation, inventors of the present disclosure have realized that the time correlation is time-invariant. Therefore, in some implementations, the sample-independent attention mechanism may also be applied along the time axis. Specifically, in such implementations, applying the attention mechanism shown by the arrow 450 may be implemented through a fully connected layer. In the process of training the system 200 with a reference audio signal, a parameter of the fully connected layer may be learned. In other words, the parameter of the fully connected layer indicates the correlation of the reference audio signal in T time periods. The process of applying the sample-independent attention mechanism to a certain time-domain feature representation 440 corresponds to the process of multiplying a T×1 vector by a T×T weight matrix. In this specification, the parameter of the fully connected layer indicating the time correlation is also referred to time-domain weighting information.

In some implementations, the sample-independent attention mechanism may be applied on both the frequency and time paths. In such implementations, the attention block 320 may also be referred to a sample-independent dual-path block (SDAB). By applying the sample-independent attention mechanism, the computational complexity of the network of the system 200 may be reduced without degrading the performance of speech enhancement.

Still with reference to FIG. 4, after obtaining the time correlation information 430 and the frequency correlation information 460, the feature representation $S^i$ is determined based on the frequency correlation information 430, the time correlation information 460 and the feature representation 401. Specifically, the frequency correlation information 430 including TC frequency-domain feature representations may be rebuilt as a feature representation with dimension T×F×C, and the time correlation information 460 including FC frequency-domain feature representations may be rebuilt as a feature representation with dimension T×F×C. The two rebuilt feature representations and the feature representation 401 are combined into the feature $S^i$.

As one example, in FIG. 4, the two rebuilt feature representations and the feature representation 401 may be concatenated by channel. Then, a convolution layer 470 may be applied to the concatenated feature representation, so that the feature representation $S^i$ with dimension T×F×C is obtained. As another example, features in the same positions of the two rebuilt feature representations and the feature representation 401 may be directly added up to obtain the feature representation S with dimension T×F×C. Implementations of the subject matter described herein are not limited in this regard.

Description has been presented to DAB with reference to FIG. 4. Now reference is made back to FIG. 2. In some implementations, each of the correlation units 220-1 to 220-N may include DAB. In other words, both the time correlation and the frequency correlation may be used in each correlation unit 220. In other implementations, at least one of the correlation units 220-1 to 220-N may include DAB, and other correlation units may only use the attention mechanism on the frequency path.

As one example, the dual-path attention mechanism may only be used in the first correlation unit 220-1, and at the same time the attention mechanism may only be used on the frequency path in the following correlation units 220-2 to 220-N. Using the time correlation in the front part of the classification network 250 helps to improve the speech enhancement performance.

Figure 5:
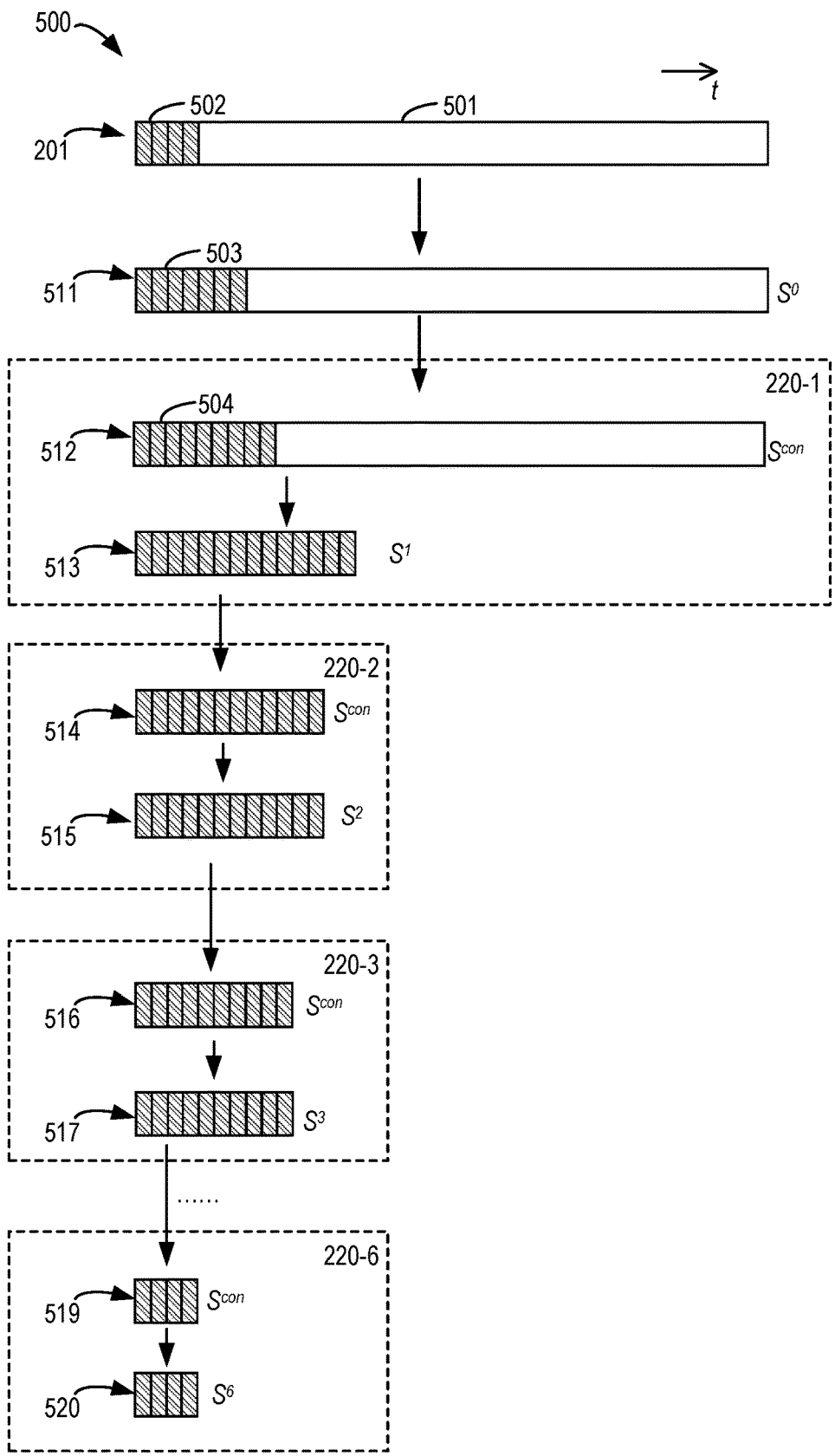
FIG. 5 illustrates a block diagram of changes of a data stream in accordance with some implementations of the subject matter described herein.

As mentioned above, in some implementations, the dimension of the target feature representation in the time domain may be below the dimension of the time-frequency representation 201 in the time domain. For example, in an online implementation, in order to meet real-time requirements, the duration of the input audio signal 170 is usually short. In order to apply the long-range correlation in the time domain, a processed audio signal needs to be used. FIG. 5 shows a block diagram 500 of changes of a data stream in the system 200 in accordance with some implementations of the subject matter described herein. FIG. 5 will be described in conjunction with FIG. 2. As shown in FIG. 5, the time-frequency representation 201 includes the first time-frequency representation 501 of the processed audio signal and the second time-frequency representation 502 of the input audio signal 170. In the example of FIG. 5, the unprocessed input audio signal 170 involves 4 time periods in the time domain, which corresponds to the shaded second time-frequency representation 502.

The convolution layer 210 may generate a feature representation 511 based on the time-frequency representation 201, where a shaded part 503 is associated with the second time-frequency representation 502. That is, the part 503 is determined based on the second time-frequency representation 502. The part that is not shaded is not updated, so that data for processing a previous input audio signal may be used.

The feature representation 511 is fed to the first correlation unit 220-1. The correlation unit 220-1 applies one or more convolution layers (e.g., the convolution layers 311 to 314 shown in FIG. 3) to the feature representation 511 to generate a feature representation 512. In the feature representation 512, a shaded part 504 is associated with the second time-frequency representation 502. That is, the part 504 is determined based on the second time-frequency representation 502. The part that is not shaded is not updated, so that data for processing a previous input audio signal may be used.

Next, the correlation unit 220-1 applies DAB to the feature representation 512 to generate a feature representation 513. The feature representation 513 may only include the part associated with the second time-frequency representation 502. As seen from FIG. 5, the feature representation 513 is shortened in the time domain relative to the feature representation 512.

Figure 6:
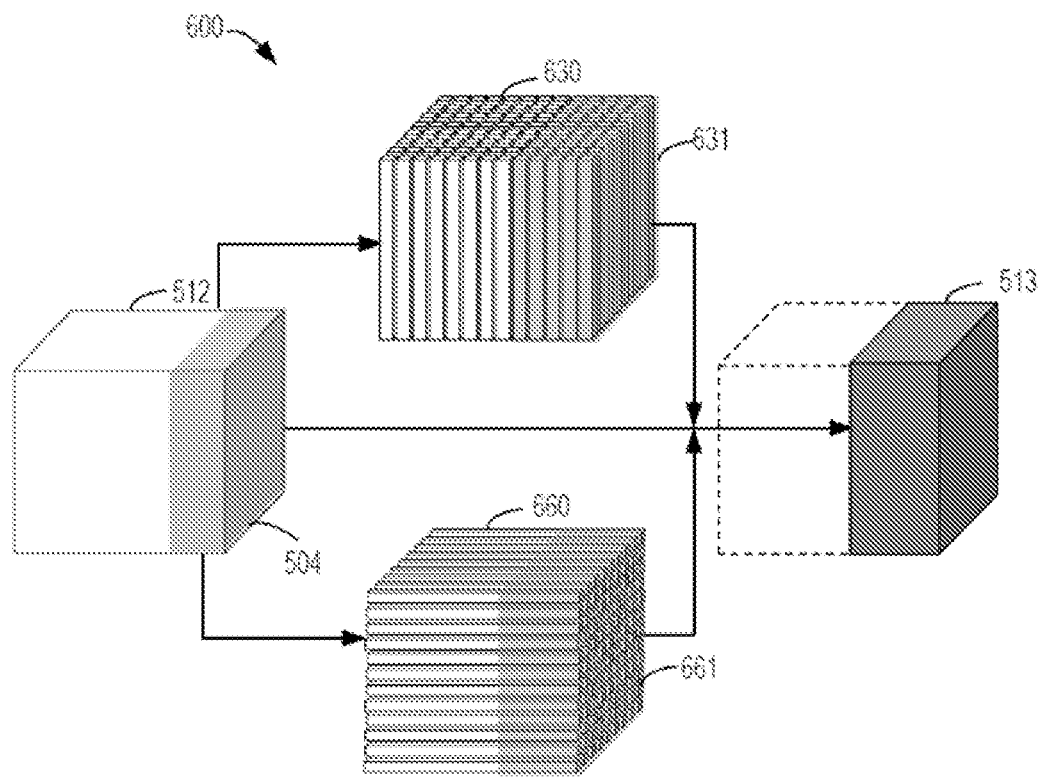
FIG. 6 illustrates a block diagram of generating a feature representation in accordance with some implementations of the subject matter described herein.

FIG. 6 shows a block diagram 600 of generating a feature representation in accordance with some implementations of the subject matter described herein. FIG. 6 will be described in conjunction with FIGS. 4 and 5. The feature representation 512 may be considered as one implementation of the feature representation 401. On the time path, the feature representation 512 is decomposed into multiple time-domain feature representations, and time correlation information 660 is determined by applying the attention mechanism along the time axis. The time correlation information 660 may be considered as one implementation of the time correlation information 460. Partial information (also referred to as the first partial information 661) in the time correlation information 660 is associated with the second time-frequency representation 502. That is, the first partial information 661 is determined in a way that is at least partly associated with the second time-frequency representation 502.

On the frequency path, the feature representation 512 is decomposed into multiple frequency-domain feature representations, and frequency correlation information 630 is determined by applying the attention mechanism along the frequency axis. The frequency correlation information 630 may be considered as one implementation of the frequency correlation information 430. Partial information (also referred to as the second partial information 631) in the frequency correlation information 630 is associated with the second time-frequency representation 502. For example, the second partial information 631 corresponds to the first partial information 661 in the time axis.

Next, the feature representation 513 shown in gray may be determined based on the first partial information 661, the second partial information 631 and the feature representation 512 (specifically, the part of the feature representation 512 which corresponds to the first partial information 661 and/or the second partial information 631 in the time axis). It should be appreciated that the part shown in a dashed box may not be determined or outputted. The feature representation 513 is determined in a way similar to the one described with reference to FIG. 4, which is not described here.

Still with reference to FIG. 5, as compared with the time-frequency representation 201, the feature representation 513 generated by the first correlation unit 220-1 is shortened in the time domain but remains unchanged in the frequency domain. Therefore, the attention mechanism is only applied in the frequency domain in the following correlation units 220-2 to 220-6, that is, only the frequency correlation is used.

Specifically, the correlation unit 220-2 applies one or more convolution layers (e.g., the convolution layers 311 to 314 shown in FIG. 3) to the feature representation 513 to generate a feature representation 514. In the example of FIG. 5, as compared with the feature representation 513, the feature representation 514 is shortened in the time domain because of a convolution operation. Next, the correlation unit 220-2 applies the attention mechanism in the frequency domain to generate a feature representation 515.

The correlation unit 220-3 applies one or more convolution layers (e.g., the convolution layers 311 to 314 shown in FIG. 3) to the feature representation 515 to generate a feature representation 516. In the example of FIG. 5, as compared with the feature representation 515, the feature representation 516 is shortened in the time domain because of a convolution operation. Next, the correlation unit 220-3 applies the attention mechanism in the frequency domain to generate a feature representation 517.

Similar operations are performed in correlation units that are not shown. The last correlation unit 220-6 applies the attention mechanism to a feature representation 519 in the frequency domain so as to determine a feature representation 520 as a target feature representation. As seen from FIG. 6, the feature representation 520 is associated with 4 time periods in the time domain, which corresponds to the duration of the input audio signal 170.

Example implementations of using the processed audio signal to process the input audio signal with a short duration have been described with reference to FIGS. 5 and 6. It should be appreciated that the number of correlation units and the number of associated time periods in the time domain are merely schematic and not intended to limit the scope of the subject matter described herein. In this way, the time correlation and the frequency correlation may be used in parallel so as to improve the performance of speech enhancement without affecting the timeliness requirement in online scenarios.

Training of Speech Enhancement System

Still with reference to FIG. 2, the system 200 may be trained using a reference audio signal including a reference speech signal and a reference noise signal. The reference speech signal may be a pure speech signal. The reference speech signal and the reference noise signal are synthesized into the reference audio signal to train the system 200.

In some implementations, the reference noise signal may include various types of noise. The system 200 trained as such is universal and applicable to speech enhancement in various scenarios.

In some implementations, the reference noise signal may include one or more specific types of noise (e.g., engine sound and the like). The system 200 trained as such is especially suitable for speech enhancement in specific scenarios, where there are one or more specific noise.

In some implementations, the system 200 may be trained under a T-F domain architecture. That is, a loss function may be calculated between the time-frequency representation $S^{in}$ and the masked time-frequency representation $S^{out}$.

In some implementations, a cross-domain training process may be implemented. That is, the loss function may be calculated between the input audio signal 170 and the output audio signal 180. In such implementations, the speech enhancement performance of the system 200 may further be improved. For example, both the signal distortion ratio (SDR) and the perceptual evaluation of speech quality (PESQ) may be improved.

Example Method and Example Implementation

Figure 7:
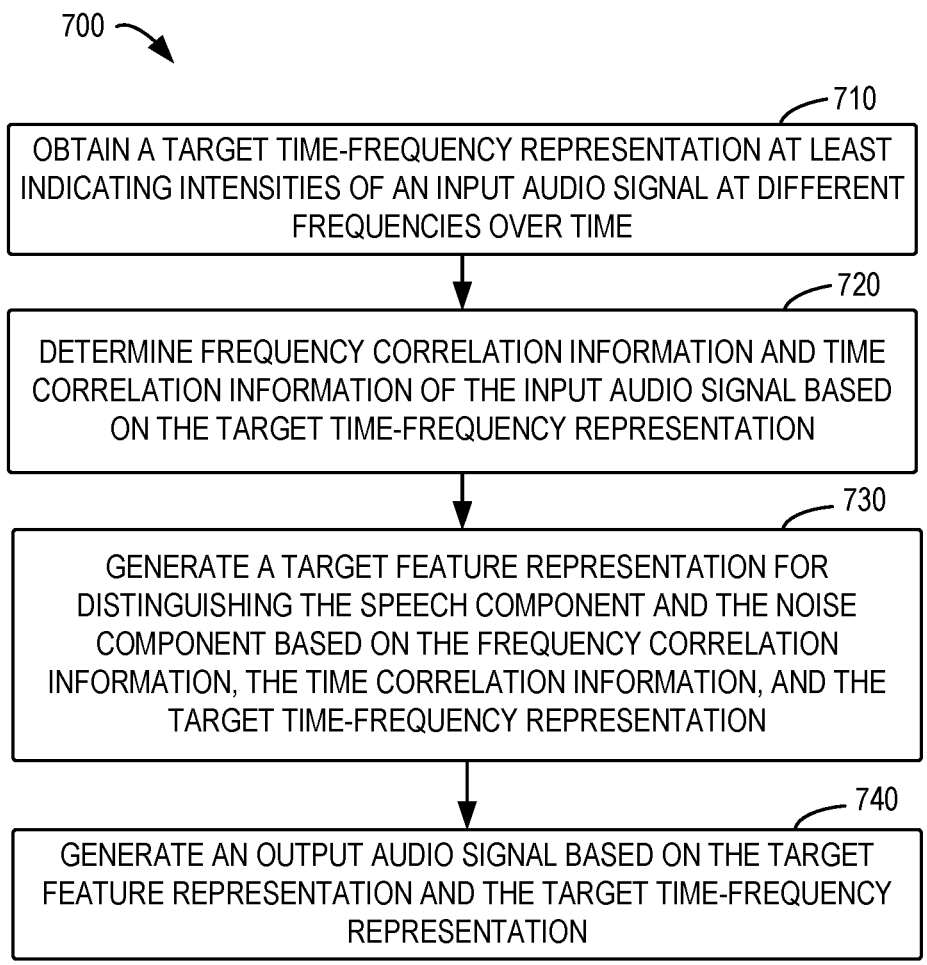
FIG. 7 illustrates a flowchart of a method for speech enhancement in accordance with some implementations of the subject matter described herein.

FIG. 7 shows a flowchart of a method 700 for speech enhancement in accordance with some implementations of the subject matter described herein. The method 700 may be implemented by the computing device 100, for example, may be implemented at the audio processing module 122 in the memory 120 of the computing device 100.

As shown in FIG. 7, at block 710, the computing device 100 obtains a target time-frequency representation at least indicating intensities of an input audio signal at different frequencies over time. The input audio signal comprises a speech component and a noise component. At block 720, the computing device 100 determines frequency correlation information and time correlation information of the input audio signal based on the target time-frequency representation. At block 730, the computing device 100 generates a target feature representation for distinguishing the speech component and the noise component based on the frequency correlation information, the time correlation information, and the target time-frequency representation. At block 740, the computing device 100 generates an output audio signal based on the target feature representation and the target time-frequency representation. The speech component is enhanced relative to the noise component in the output audio signal.

In some implementations, generating the target feature representation comprises: generating an intermediate feature representation for distinguishing the speech component and the noise component based on the frequency correlation information, the time correlation information and the convolved target time-frequency representation; updating the frequency correlation information based on the intermediate feature representation; and determining the target feature representation based on the intermediate feature representation and the updated frequency correlation information.

In some implementations, generating the target feature representation comprises: generating an intermediate feature representation for distinguishing the speech component and the noise component based on the frequency correlation information, the time correlation information and the convolved target time-frequency representation; updating the frequency correlation information and the time correlation information based on the intermediate feature representation; and determining the target feature representation based on the intermediate feature representation, the updated frequency correlation information and the updated time correlation information.

In some implementations, obtaining the target time-frequency representation comprises: obtaining a first time-frequency representation of a processed audio signal occurring before the input audio signal, the first time-frequency representation indicating intensities of the processed audio signal at the different frequencies over time; determining a second time-frequency representation of the input audio signal, the second time-frequency representation indicating intensities of the input audio signal at the different frequencies over time; and combining the first time-frequency representation and the second time-frequency representation into the target time-frequency representation.

In some implementations, generating the target feature representation comprises: determining first partial information of the time correlation information associated with the second time-frequency representation; determining second partial information of the frequency correlation information associated with the second time-frequency representation; and determining the target feature representation based on the first partial information, the second partial information and the target time-frequency representation.

In some implementations, the target time-frequency representation is associated with a plurality of frequency bands in frequency-domain and a plurality of time periods in time-domain. Determining the frequency correlation information and the time correlation information comprises: obtaining a frequency-domain feature representation and a time-domain feature representation by processing the target time-frequency representation, the frequency-domain feature representation comprising a plurality of features at the plurality of frequency bands over one of the plurality of time periods, the time-domain feature representation comprising a plurality of features over the plurality of time periods at one of the plurality of frequency bands; determining the frequency correlation information based on the frequency-domain feature representation and frequency-domain weighting information, the frequency-domain weighting information indicating a correlation degree of a reference audio signal among the plurality of frequency bands; and determining the time correlation information based on the time-domain feature representation and time-domain weighting information, the time-domain weighting information indicating a correlation degree of a reference audio signal among the plurality of time periods.

In some implementations, the frequency-domain weighting information and the time-domain weighting information is determined based on the reference audio signal comprising a reference speech signal and a reference noise signal.

In some implementations, generating the output audio signal comprises: determining a masked time-frequency representation by applying a mask to at least one portion of the target time-frequency representation, the mask is generated based on the target feature representation; and converting the masked time-frequency representation into the output audio signal.

In some implementations, converting the masked time-frequency representation into the output audio signal comprises: converting the masked time-frequency representation into the output audio signal by applying the masked time-frequency representation to a trained decoder, wherein the trained decoder is configured to convert intensities of an audio signal at the different frequencies over time into a waveform over time.

As seen from the foregoing description, the speech enhancement solution in accordance with implementations of the subject matter described herein can make full use of the time-domain and frequency-domain correlation information of the audio signal. In this way, the performance of speech enhancement can be improved, which helps to obtain completely pure speech.

Some example implementations of the subject matter described herein are listed below.

In one aspect, the subject matter described herein provides a computer-implemented method. The method comprises: obtaining a target time-frequency representation at least indicating intensities of an input audio signal at different frequencies over time, the input audio signal comprising a speech component and a noise component; determining frequency correlation information and time correlation information of the input audio signal based on the target time-frequency representation; generating a target feature representation for distinguishing the speech component and the noise component based on the frequency correlation information, the time correlation information, and the target time-frequency representation; generating an output audio signal based on the target feature representation and the target time-frequency representation, the speech component is enhanced relative to the noise component in the output audio signal.

In some implementations, generating the target feature representation comprises: generating an intermediate feature representation for distinguishing the speech component and the noise component based on the frequency correlation information, the time correlation information and the convolved target time-frequency representation; updating the frequency correlation information based on the intermediate feature representation; and determining the target feature representation based on the intermediate feature representation and the updated frequency correlation information.

In some implementations, generating the target feature representation comprises: generating an intermediate feature representation for distinguishing the speech component and the noise component based on the frequency correlation information, the time correlation information and the convolved target time-frequency representation; updating the frequency correlation information and the time correlation information based on the intermediate feature representation; and determining the target feature representation based on the intermediate feature representation, the updated frequency correlation information and the updated time correlation information.

In some implementations, obtaining the target time-frequency representation comprises: obtaining a first time-frequency representation of a processed audio signal occurring before the input audio signal, the first time-frequency representation indicating intensities of the processed audio signal at the different frequencies over time; determining a second time-frequency representation of the input audio signal, the second time-frequency representation indicating intensities of the input audio signal at the different frequencies over time; and combining the first time-frequency representation and the second time-frequency representation into the target time-frequency representation.

In some implementations, generating the target feature representation comprises: determining first partial information of the time correlation information associated with the second time-frequency representation; determining second partial information of the frequency correlation information associated with the second time-frequency representation; and determining the target feature representation based on the first partial information, the second partial information and the target time-frequency representation.

In some implementations, the target time-frequency representation is associated with a plurality of frequency bands in frequency-domain and a plurality of time periods in time-domain. Determining the frequency correlation information and the time correlation information comprises: obtaining a frequency-domain feature representation and a time-domain feature representation by processing the target time-frequency representation, the frequency-domain feature representation comprising a plurality of features at the plurality of frequency bands over one of the plurality of time periods, the time-domain feature representation comprising a plurality of features over the plurality of time periods at one of the plurality of frequency bands; determining the frequency correlation information based on the frequency-domain feature representation and frequency-domain weighting information, the frequency-domain weighting information indicating a correlation degree of a reference audio signal among the plurality of frequency bands; and determining the time correlation information based on the time-domain feature representation and time-domain weighting information, the time-domain weighting information indicating a correlation degree of a reference audio signal among the plurality of time periods.

In some implementations, the frequency-domain weighting information and the time-domain weighting information is determined based on the reference audio signal comprising a reference speech signal and a reference noise signal.

In some implementations, generating the output audio signal comprises: determining a masked time-frequency representation by applying a mask to at least one portion of the target time-frequency representation, the mask is generated based on the target feature representation; and converting the masked time-frequency representation into the output audio signal.

In some implementations, converting the masked time-frequency representation into the output audio signal comprises: converting the masked time-frequency representation into the output audio signal by applying the masked time-frequency representation to a trained decoder, wherein the trained decoder is configured to convert intensities of an audio signal at the different frequencies over time into a waveform over time.

In another aspect, the subject matter described herein provides an electronic device. The electronic device comprises: a processing unit; and a memory coupled to the processing unit and comprising instructions stored thereon which, when executed by the processing unit, cause the device to perform acts comprising: obtaining a target time-frequency representation at least indicating intensities of an input audio signal at different frequencies over time, the input audio signal comprising a speech component and a noise component; determining frequency correlation information and time correlation information of the input audio signal based on the target time-frequency representation; generating a target feature representation for distinguishing the speech component and the noise component based on the frequency correlation information, the time correlation information, and the target time-frequency representation; generating an output audio signal based on the target feature representation and the target time-frequency representation, the speech component is enhanced relative to the noise component in the output audio signal.

In some implementations, generating the target feature representation comprises: generating an intermediate feature representation for distinguishing the speech component and the noise component based on the frequency correlation information, the time correlation information and the convolved target time-frequency representation; updating the frequency correlation information based on the intermediate feature representation; and determining the target feature representation based on the intermediate feature representation and the updated frequency correlation information.

In some implementations, generating the target feature representation comprises: generating an intermediate feature representation for distinguishing the speech component and the noise component based on the frequency correlation information, the time correlation information and the convolved target time-frequency representation; updating the frequency correlation information and the time correlation information based on the intermediate feature representation; and determining the target feature representation based on the intermediate feature representation, the updated frequency correlation information and the updated time correlation information.

In some implementations, obtaining the target time-frequency representation comprises: obtaining a first time-frequency representation of a processed audio signal occurring before the input audio signal, the first time-frequency representation indicating intensities of the processed audio signal at the different frequencies over time; determining a second time-frequency representation of the input audio signal, the second time-frequency representation indicating intensities of the input audio signal at the different frequencies over time; and combining the first time-frequency representation and the second time-frequency representation into the target time-frequency representation.

In some implementations, generating the target feature representation comprises: determining first partial information of the time correlation information associated with the second time-frequency representation; determining second partial information of the frequency correlation information associated with the second time-frequency representation; and determining the target feature representation based on the first partial information, the second partial information and the target time-frequency representation.

In some implementations, the target time-frequency representation is associated with a plurality of frequency bands in frequency-domain and a plurality of time periods in time-domain. Determining the frequency correlation information and the time correlation information comprises: obtaining a frequency-domain feature representation and a time-domain feature representation by processing the target time-frequency representation, the frequency-domain feature representation comprising a plurality of features at the plurality of frequency bands over one of the plurality of time periods, the time-domain feature representation comprising a plurality of features over the plurality of time periods at one of the plurality of frequency bands; determining the frequency correlation information based on the frequency-domain feature representation and frequency-domain weighting information, the frequency-domain weighting information indicating a correlation degree of a reference audio signal among the plurality of frequency bands; and determining the time correlation information based on the time-domain feature representation and time-domain weighting information, the time-domain weighting information indicating a correlation degree of a reference audio signal among the plurality of time periods.

In some implementations, the frequency-domain weighting information and the time-domain weighting information is determined based on the reference audio signal comprising a reference speech signal and a reference noise signal.

In some implementations, generating the output audio signal comprises: determining a masked time-frequency representation by applying a mask to at least one portion of the target time-frequency representation, the mask is generated based on the target feature representation; and converting the masked time-frequency representation into the output audio signal.

In some implementations, converting the masked time-frequency representation into the output audio signal comprises: converting the masked time-frequency representation into the output audio signal by applying the masked time-frequency representation to a trained decoder, wherein the trained decoder is configured to convert intensities of an audio signal at the different frequencies over time into a waveform over time.

In a further aspect, the subject matter described herein provides a computer program product being tangibly stored in a non-transitory computer storage medium and comprising machine-executable instructions which, when executed by a device, causing the device to perform the method of the above aspect.

In another aspect, the subject matter described herein provides a computer-readable medium having machine-executable instructions stored thereon which, when executed by a device, cause the device to perform the method of the above aspect.

The functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and the like.

Program code for carrying out methods of the subject matter described herein may be written in any combination of one or more programming languages. These program codes may be provided to a processor or controller of a general purpose computer, a special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or a server.

In the context of this subject matter described herein, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be appreciated that the operations are required to be executed in the particular order shown or in a sequential order, or all operations shown are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
obtaining a target time-frequency representation at least indicating intensities of an input audio signal at different frequencies over time, the input audio signal comprising a speech component and a noise component;
processing the target time-frequency representation to generate a target feature representation for distinguishing the speech component and the noise component, the processing comprising using a dual-path attention block to:
determine frequency correlation information and time correlation information of the input audio signal based on a first feature representation derived from the target time-frequency representation, and
combine the first feature representation, the frequency correlation information, and the time correlation information into a second feature representation,
wherein the target feature representation is derived from or consist of the second feature representation; and
generating an output audio signal based on the target feature representation and the target time-frequency representation, the speech component being enhanced relative to the noise component in the output audio signal.

2. The method of claim 1, wherein:
the second feature representation is an intermediate feature representation for distinguishing the speech component and the noise component; and
generating the target feature representation comprises:
updating the frequency correlation information based on the intermediate feature representation, and determining the target feature representation based on the intermediate feature representation and the updated frequency correlation information.

3. The method of claim 1, wherein:
the second feature representation is an intermediate feature representation for distinguishing the speech component and the noise component; and
generating the target feature representation comprises:
updating the frequency correlation information and the time correlation information based on the intermediate feature representation; and
determining the target feature representation based on the intermediate feature representation, the updated frequency correlation information, and the updated time correlation information.

4. The method of claim 1, wherein obtaining the target time-frequency representation comprises:
obtaining a first time-frequency representation of a processed audio signal occurring before the input audio signal, the first time-frequency representation indicating intensities of the processed audio signal at the different frequencies over time;
determining a second time-frequency representation of the input audio signal, the second time-frequency representation indicating intensities of the input audio signal at the different frequencies over time; and
combining the first time-frequency representation and the second time-frequency representation into the target time-frequency representation.

5. The method of claim 4, wherein:
determining frequency correlation information and time correlation information of the input audio signal based on the first feature representation comprises:
determining first partial information of the time correlation information, the first partial information being associated with a part of the first feature representation associated with the second time-frequency representation; and
determining second partial information of the frequency correlation information, the second partial information being associated with a part of the first feature representation associated with the second time-frequency representation; and
combining the first feature representation, the feature correlation information, and the time correlation information into a second feature representation comprises combining the first feature representation, the first partial information, and the second partial information into the second feature representation.

6. The method of claim 1, wherein the target time-frequency representation is associated with a plurality of frequency bands in frequency-domain and a plurality of time periods in time-domain, and determining the frequency correlation information and the time correlation information comprises:
obtaining a frequency-domain feature representation and a time-domain feature representation by processing the target time-frequency representation, the frequency-domain feature representation comprising a plurality of features at the plurality of frequency bands over one of the plurality of time periods, the time-domain feature representation comprising a plurality of features over the plurality of time periods at one of the plurality of frequency bands;
determining the frequency correlation information based on the frequency-domain feature representation and frequency-domain weighting information, the frequency-domain weighting information indicating a correlation of a reference audio signal in the plurality of frequency bands; and
determining the time correlation information based on the time-domain feature representation and time-domain weighting information, the time-domain weighting information indicating a correlation of a reference audio signal in the plurality of time periods.

7. The method of claim 6, wherein the frequency-domain weighting information and the time-domain weighting information is determined based on the reference audio signal comprising a reference speech signal and a reference noise signal.

8. The method of claim 1, wherein generating the output audio signal comprises:
determining a masked time-frequency representation by applying a mask to at least one portion of the target time-frequency representation, the mask being generated based on the target feature representation; and
converting the masked time-frequency representation into the output audio signal.

9. The method of claim 8, wherein converting the masked time-frequency representation into the output audio signal comprises:
converting the masked time-frequency representation into the output audio signal by applying the masked time-frequency representation to a trained decoder, wherein the trained decoder is configured to convert intensities of an audio signal at the different frequencies over time into a waveform over time.

10. An electronic device, comprising:
a processing unit; and
a memory coupled to the processing unit and comprising instructions stored thereon which, when executed by the processing unit, cause the device to perform acts comprising:
obtaining a target time-frequency representation at least indicating intensities of an input audio signal at different frequencies over time, the input audio signal comprising a speech component and a noise component;
processing the target time-frequency representation to generate target feature representation for distinguishing the speech component and the noise component, the processing comprising using a dual-path attention block to:
determine frequency correlation information and time correlation information of the input audio signal based on a first feature representation derived from the target time-frequency representation, and
combine the first feature representation, the frequency correlation information, and the time correlation information into a second feature representation,
wherein the target feature representation is derived from or consists of the second feature representation; and
generating an output audio signal based on the target feature representation and the target time-frequency representation, the speech component being enhanced relative to the noise component in the output audio signal.

11. The device of claim 10, wherein
the second feature representation is an intermediate feature representation for distinguishing the speech component and the noise component; and
generating the target feature representation comprises:
updating the frequency correlation information based on the intermediate feature representation, and determining the target feature representation based on the intermediate feature representation and the updated frequency correlation information.

12. The device of claim 10, wherein
the second feature representation is an intermediate feature representation for distinguishing the speech component and the noise component; and
generating the target feature representation comprises:
    updating the frequency correlation information and the time correlation information based on the intermediate feature representation, and
    determining the target feature representation based on the intermediate feature representation, the updated frequency correlation information and the updated time correlation information.

13. The device of claim 10, wherein obtaining the target time-frequency representation comprises:
    obtaining a first time-frequency representation of a processed audio signal occurring before the input audio signal, the first time-frequency representation indicating intensities of the processed audio signal at the different frequencies over time;
    determining a second time-frequency representation of the input audio signal, the second time-frequency representation indicating intensities of the input audio signal at the different frequencies overtime; and
    combining the first time-frequency representation and the second time-frequency representation into the target time-frequency representation.

14. The device of claim 13, wherein:
determining frequency correlation information and time correlation information of the input audio signal based on the first feature representation comprises:
    determining first partial information of the time correlation information the first partial information being associated with the second time-frequency representation;
    determining second partial information of the frequency correlation information, the second partial information being associated with the second time-frequency representation; and
wherein combining the first feature representation, the feature correlation information, and the time correlation information into a second feature representation comprises combining the first feature representation, the first partial information, and the second partial information into the second feature representation.

15. A computer program product being tangibly stored in a non-transitory computer storage medium and comprising machine-executable instructions which, when executed by a device, cause the device to perform acts comprising:
    obtaining a target time-frequency representation at least indicating intensities of an input audio signal at different frequencies over time, the input audio signal comprising a speech component and a noise component;
    processing the target time-frequency representation to generate a target feature representation for distinguishing the speech component and the noise component, the processing comprising using a dual-path attention block to:
        determine frequency correlation information and time correlation information of the input audio signal based on a first feature representation derived from the target time-frequency representation, and
        combine the first feature representation, the frequency correlation information, and the time correlation information into a second feature representation,
        wherein the target feature representation is derived from or consist of the second feature representation; and
    generating an output audio signal based on the target feature representation and the target time-frequency representation, the speech component being enhanced relative to the noise component in the output audio signal.

* * * * *